US012626140B2

(12) United States Patent     (10) Patent No.:    US 12,626,140 B2
Pham et al.            (45) Date of Patent:     May 12, 2026

(54) SYSTEMS AND METHODS FOR ONLINE TIME SERIES FORECASTING

(71) Applicant: Salesforce, Inc., San Francisco, CA (US)

(72) Inventors: Hong-Quang Pham, Singapore (SG); Chenghao Liu, Singapore (SG); Doyen Sahoo, Singapore (SG); Chu Hong Hoi, Singapore (SG)

(73) Assignee: Salesforce, Inc., San Francisco, CA (US)

( * ) Notice: Subject to any disclaimer, the term of this patent is extended or adjusted under 35 U.S.C. 154(b) by 964 days.

(21) Appl. No.: 17/871,819

(22) Filed: Jul. 22, 2022

(65) Prior Publication Data

US 2023/0244943 A1     Aug. 3, 2023

Related U.S. Application Data

(60) Provisional application No. 63/305,145, filed on Jan. 31, 2022.

(51) Int. Cl.
*G06N 3/084*       (2023.01)
*G06N 3/047*       (2023.01)

(52) U.S. Cl.
CPC ............. *G06N 3/084* (2013.01); *G06N 3/047* (2023.01)

(58) Field of Classification Search
CPC ........ G06N 3/084; G06N 3/047; G06N 3/044; G06N 3/045; G06N 3/0464; G06N 3/048; G06N 3/08; G06N 3/09
See application file for complete search history.

(56) References Cited

FOREIGN PATENT DOCUMENTS

JP     2019045905 A    3/2019
WO   2021252798 A1   12/2021

OTHER PUBLICATIONS

Ruan ("Context-Aware Traffic Prediction Framework Based on Series Decomposition" Nov. 9, 2020) Digital Object Identifier 10.1109/Access.2020.3036652 (Year: 2020).*
Neven ("Feed-Forward On-Edge Fine-Tuning Using Static Synthetic Gradient Modules" Sep. 21, 2020) arXiv:2009.09675v1 [cs.CV] Sep. 21, 2020 (Year: 2020).*
Wilson ("Event Triggered Analog Data Acquisition Using the Exponential Moving Average" Feb. 24, 2014) IEEE Sensors Journal, vol. 14, No. 6, Jun. 2014 (Year: 2014).*
(Continued)

*Primary Examiner* — Usmaan Saeed
*Assistant Examiner* — Su-Ting Chuang
(74) *Attorney, Agent, or Firm* — Haynes and Boone, LLP

(57) ABSTRACT

Embodiments provide a framework combining fast and slow learning Networks (referred to as "FSNet") to train deep neural forecasters on the fly for online time-series forecasting. FSNet is built on a deep neural network backbone (slow learner) with two complementary components to facilitate fast adaptation to both new and recurrent concepts. To this end, FSNet employs a per-layer adapter to monitor each layer's contribution to the forecasting loss via its partial derivative. The adapter transforms each layer's weight and feature at each step based on its recent gradient, allowing a fine grain per-layer fast adaptation to optimize the current loss. In addition, FSNet employs a second and complementary associative memory component to store important, recurring patterns observed during training. The adapter interacts with the memory to store, update, and retrieve the previous transformations, facilitating fast learning of such patterns.

20 Claims, 9 Drawing Sheets

(56) References Cited

OTHER PUBLICATIONS

Jaderberg("Decoupled Neural Interfaces using Synthetic Gradients" Mar. 7, 2017) arXiv:1608.05343v2 [cs.LG] Jul. 3, 2017 (Year: 2017).*

Omeiza ("Smooth Grad-CAM++: An Enhanced Inference Level Visualization Technique for Deep Convolutional Neural Network Models" Aug. 3, 2019) arXiv:1908.01224v1 [cs.CV] Aug. 3, 2019 (Year: 2019).*

Farha ("MS-TCN: Multi-Stage Temporal Convolutional Network for Action Segmentation" Apr. 2, 2019) arXiv:1903.01945v2 [cs.CV] Apr. 2, 2019 (Year: 2019).*

Rae ("Scaling Memory-Augmented Neural Networks with Sparse Reads and Writes" Oct. 27, 2016) arXiv:1610.09027v1 [cs.LG] Oct. 27, 2016 (Year: 2016).*

International Search Report and Written Opinion for PCT/US2023/060618, dated Mar. 27, 2023, 15 pages.

Arani et al., "Learning Fast, Learning Slow: A General Continual Learning Method Based on Complementary Learning System", ICLR Conference 2022 Retrieved from the Internet: URL:https://arxiv.org/pdf/2201.12604vl.pdf, retrieved on Mar. 27, 2023,pp. 1-22.

Sood et al., "Visual Time Series Forecasting: An Image-driven Approach", Proceedings of The 27th ACM Symposium on Virtual Reality Software and Technology, Nov. 3-5, 2021, New York, NY, 9 pages.

JP Office Action, Application No. JP 2024-545160, dated May 27, 3 pages. 2025.

Sano et al., "Multivariate time series forecasting accuracy improvement method based on LSTNet", IEICE Technical Report, PRMU2021-37(Dec. 2021), Dec. 2021, pp. 71-76.

\* cited by examiner

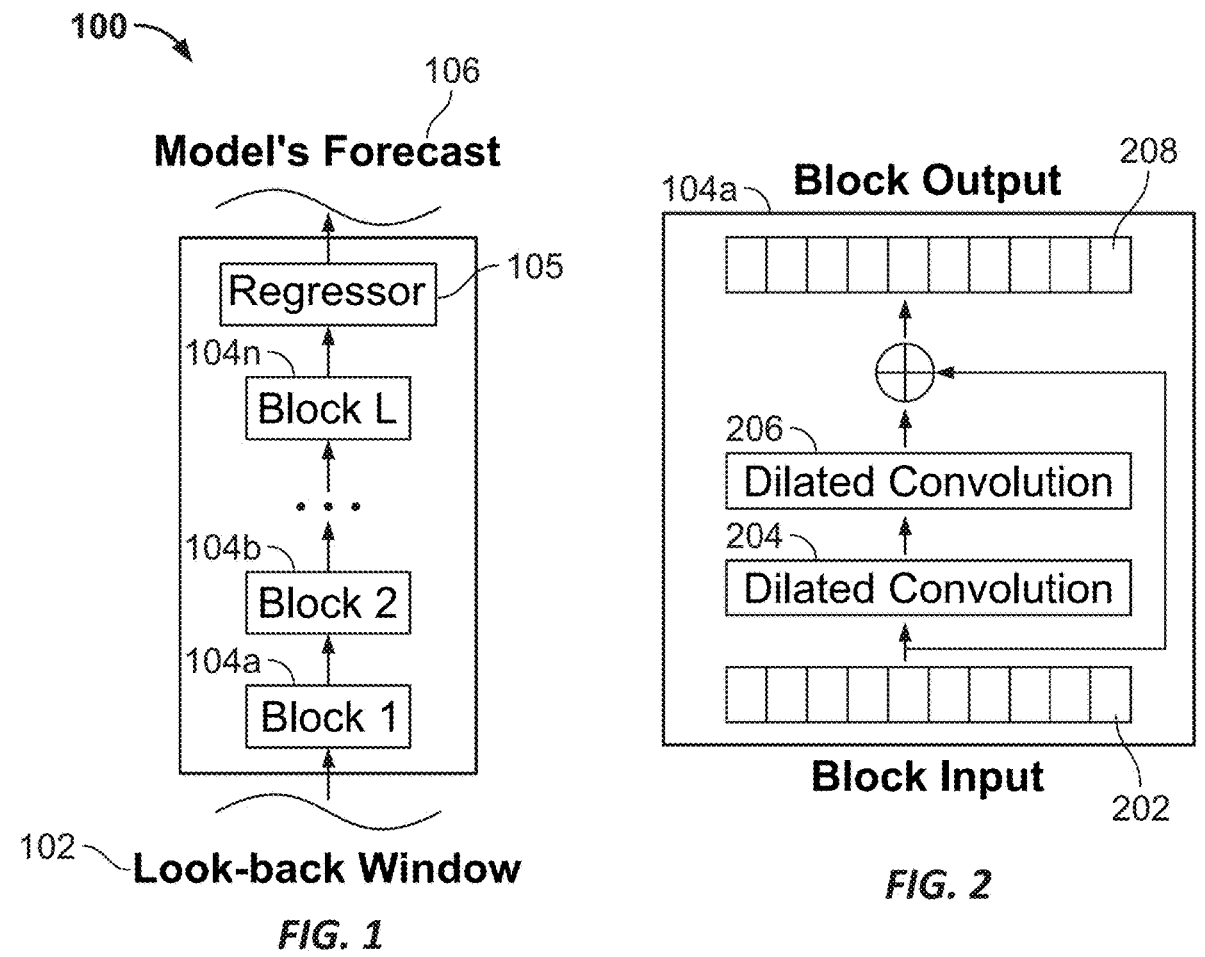
Model's Forecast 106
Block Output 208
Look-back Window 102
*FIG. 1*
*FIG. 2*
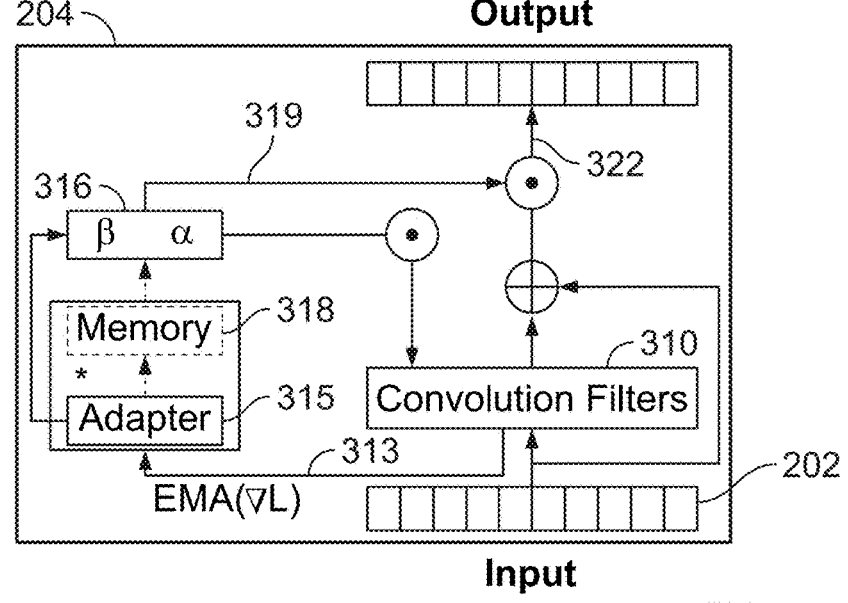
*FIG. 3*

Figure 5:
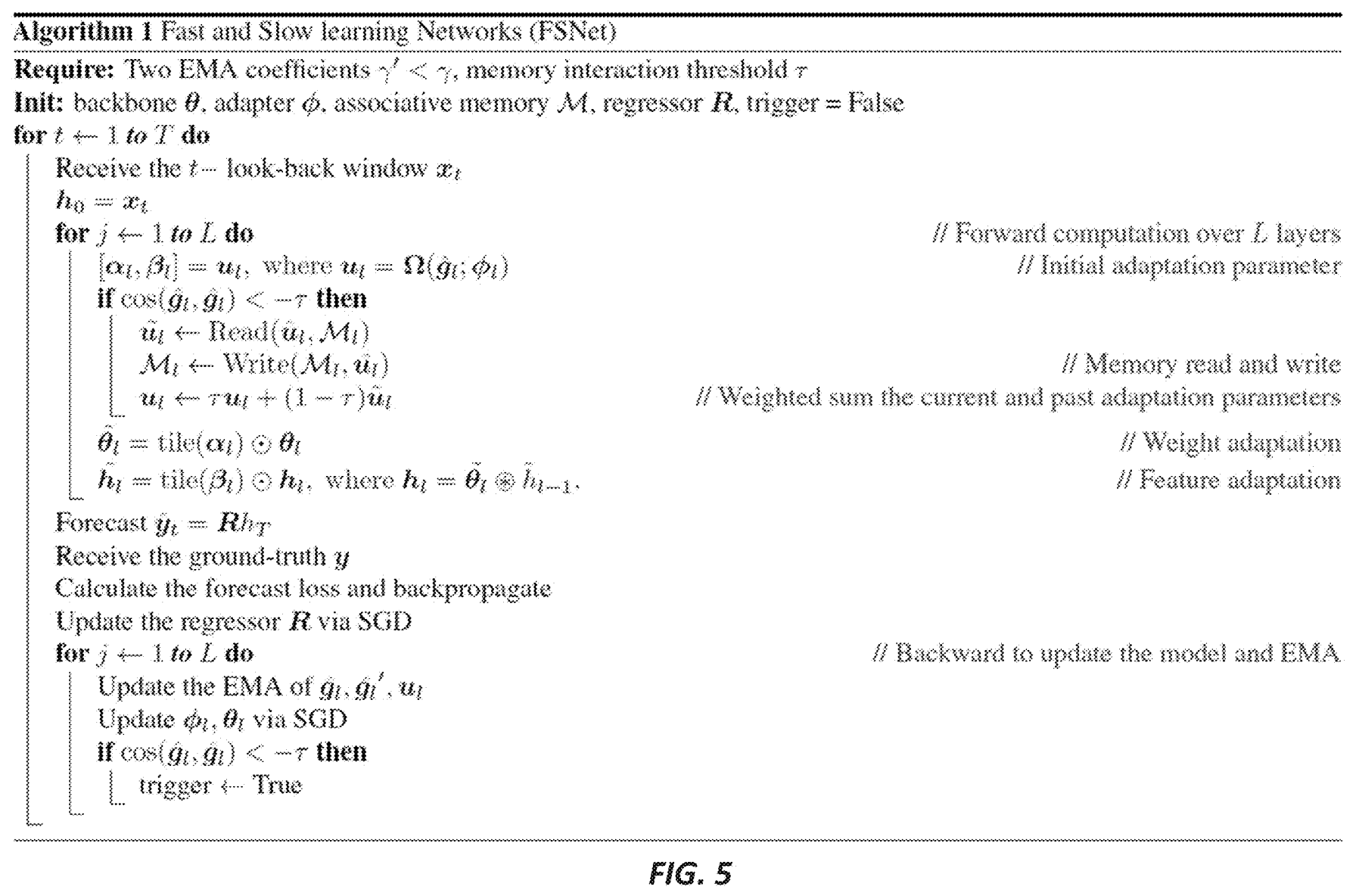

Algorithm 1 Fast and Slow learning Networks (FSNet)

Require: Two EMA coefficients $\gamma' < \gamma$, memory interaction threshold $\tau$
Init: backbone $\theta$, adapter $\phi$, associative memory $\mathcal{M}$, regressor $R$, trigger = False for $t \leftarrow 1\ to\ T$ do
    Receive the $t-$ look-back window $x_t$
    $h_0 = x_t$
    for $j \leftarrow 1\ to\ L$ do
        $[\alpha_l, \beta_l] = u_l$, where $u_l = \Omega(g_l; \phi_l)$      // Forward computation over $L$ layers
              // Initial adaptation parameter
        if $\cos(\hat{g}_l, g_l) < -\tau$ then
            $\tilde{u}_l \leftarrow \text{Read}(a_l, \mathcal{M}_l)$      // Memory read and write
            $\mathcal{M}_l \leftarrow \text{Write}(\mathcal{M}_l, u_l)$
            $u_l \leftarrow \tau u_l + (1 - \tau)\tilde{u}_l$
        $\tilde{\theta}_l = \text{tile}(\alpha_l) \odot \theta_l$
        $h_l = \text{tile}(\beta_l) \odot h_l$, where $h_l = \tilde{\theta}_l \circledast h_{l-1}$.      // Weighted sum the current and past adaptation parameters
              // Weight adaptation
              // Feature adaptation
    Forecast $\hat{y}_t = R h_T$
    Receive the ground-truth $y$
    Calculate the forecast loss and backpropagate
    Update the regressor $R$ via SGD
    for $j \leftarrow 1\ to\ L$ do
        Update the EMA of $g_l, g_l', u_l$      // Backward to update the model and EMA
        Update $\phi_l, \theta_l$ via SGD
        if $\cos(\hat{g}_l, g_l) < -\tau$ then
            trigger $\leftarrow$ True

Receive, via a data interface, a time series dataset that includes a plurality of datapoints corresponding to a plurality of timestamps within a lookback time window 602

Compute, at a first convolutional layer from a stack of convolutional layers, a first gradient based on exponential moving average of gradients corresponding to the first convolutional layer 604

Determine a first adaptation parameter corresponding to the first convolutional layer by mapping portions of the first gradient to elements of the first adaptation parameters 606

(Optional) For each convolutional layer in a temporal convolutional neural network, determine, based on the plurality of datapoints, a layer forecasting loss indicative of a loss contribution of the respective convolutional layer to an overall forecasting loss according to the plurality of datapoints 608

(Optional) Update the at least one convolutional layer based on the layer forecasting loss 610

Compute a cosine similarity between the first gradient of the updated convolutional layer and a longer-term gradient associated with the at least one first convolutional layer 612

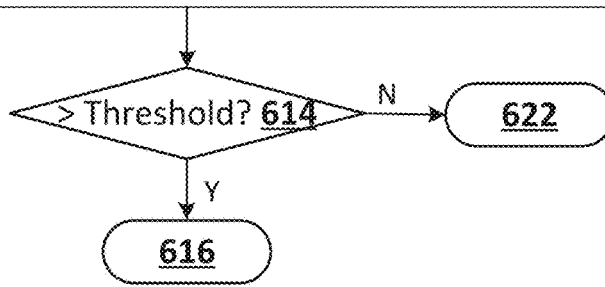

_FIG. 6_

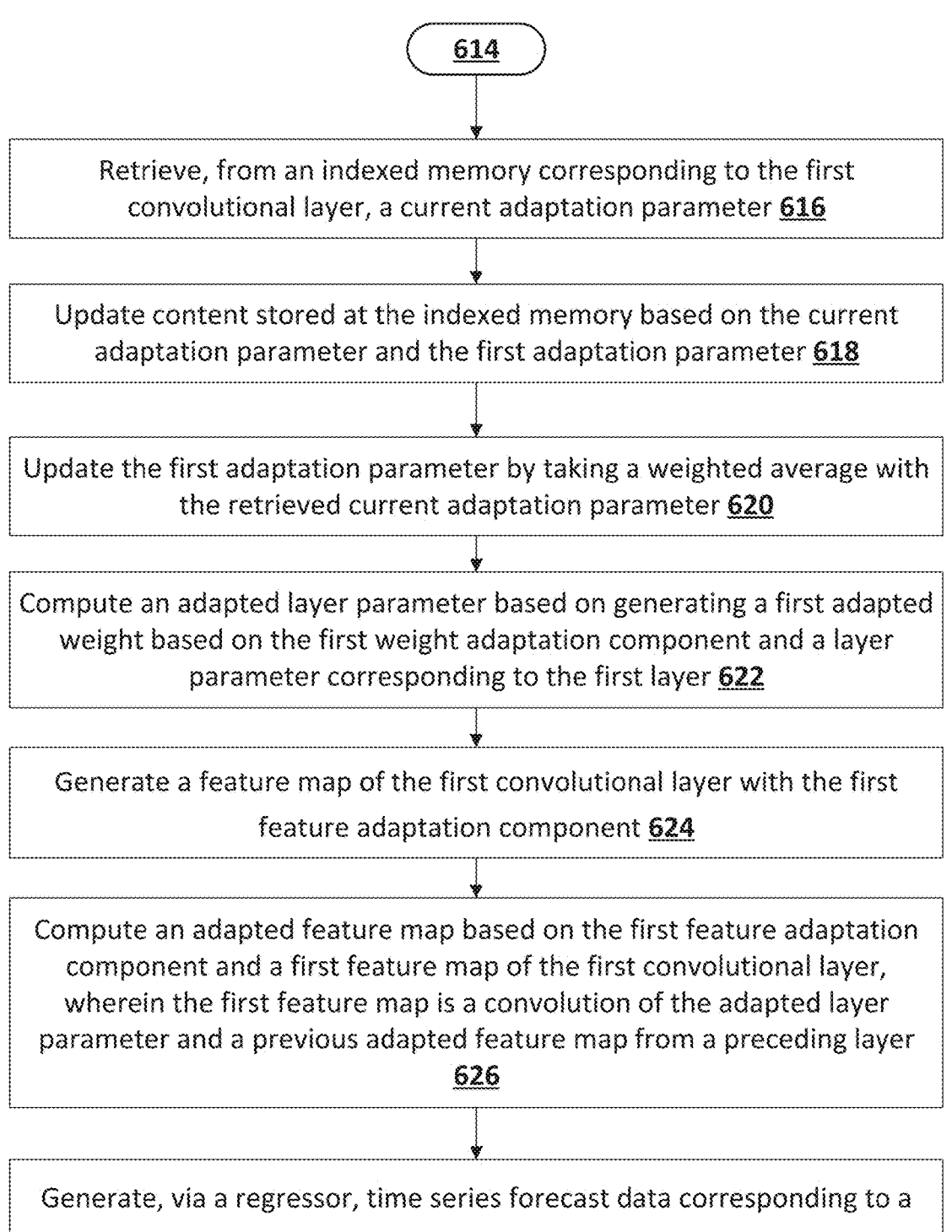

614

Retrieve, from an indexed memory corresponding to the first convolutional layer, a current adaptation parameter 616

Update content stored at the indexed memory based on the current adaptation parameter and the first adaptation parameter 618

Update the first adaptation parameter by taking a weighted average with the retrieved current adaptation parameter 620

Compute an adapted layer parameter based on generating a first adapted weight based on the first weight adaptation component and a layer parameter corresponding to the first layer 622

Generate a feature map of the first convolutional layer with the first feature adaptation component 624

Compute an adapted feature map based on the first feature adaptation component and a first feature map of the first convolutional layer, wherein the first feature map is a convolution of the adapted layer parameter and a previous adapted feature map from a preceding layer 626

Generate, via a regressor, time series forecast data corresponding to a future time window based on a final feature map output from the stack of convolutional layerss corresponding to the time series data within the lookback time window 628

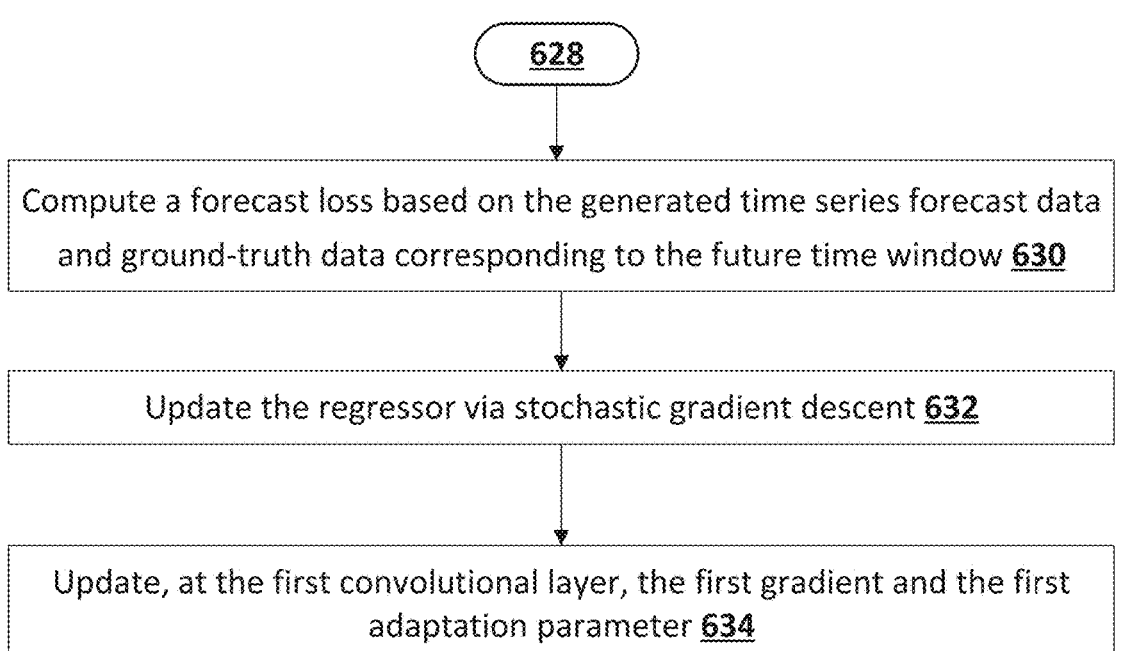
FIG. 6 (Cont')

Table 1: Final cumulative MSE and MAE of algorithms at the end of learning. "†" indicates a transformer backbone. "-" indicates the model did not converge. S-A: S-Abrupt, S-G: S-Gradual. Best results are in bold.

| Method | | FSNet | | DER++ | | MIR | | ER | | TFCL | | OnlineTCN | | Informer | |
|---|---|---|---|---|---|---|---|---|---|---|---|---|---|---|---|
| | H | MSE | MAE | MSE | MAE | MSE | MAE | MSE | MAE | MSE | MAE | MSE | MAE | MSE | MAE |
| ETTh2 | 1 | 0.466 | 0.368 | 0.508 | 0.375 | 0.486 | 0.410 | 0.508 | 0.376 | 0.557 | 0.472 | 0.502 | 0.436 | 7.571 | 0.850 |
| | 24 | 0.687 | 0.467 | 0.828 | 0.540 | 0.812 | 0.541 | 0.808 | 0.543 | 0.846 | 0.548 | 0.830 | 0.547 | 4.629 | 0.668 |
| | 48 | 0.846 | 0.515 | 1.157 | 0.577 | 1.103 | 0.565 | 1.136 | 0.571 | 1.208 | 0.592 | 1.183 | 0.589 | 5.692 | 0.752 |
| ETTm1 | 1 | 0.085 | 0.191 | 0.083 | 0.192 | 0.085 | 0.197 | 0.086 | 0.197 | 0.087 | 0.198 | 0.214 | 0.085 | 0.456 | 0.512 |
| | 24 | 0.115 | 0.249 | 0.196 | 0.326 | 0.192 | 0.325 | 0.202 | 0.333 | 0.211 | 0.341 | 0.258 | 0.381 | 0.478 | 0.525 |
| | 48 | 0.127 | 0.263 | 0.208 | 0.340 | 0.210 | 0.342 | 0.220 | 0.351 | 0.236 | 0.363 | 0.283 | 0.403 | 0.377 | 0.460 |
| ECL | 1 | 3.143 | 0.472 | 2.657 | 0.421 | 2.721 | 0.466 | 2.731 | 0.465 | 2.866 | 0.474 | 2.979 | 0.516 | - | - |
| | 24 | 10.467 | 1.022 | 11.167 | 1.090 | 11.535 | 1.128 | 11.540 | 1.125 | 13.479 | 1.112 | 13.221 | 1.147 | - | - |
| | 48 | 11.996 | 0.972 | 12.238 | 1.130 | 12.549 | 1.165 | 12.580 | 1.161 | 14.088 | 1.155 | 14.177 | 1.189 | - | - |
| Traffic | 1 | 0.321 | 0.260 | 0.402 | 0.291 | 0.419 | 0.306 | 0.412 | 0.298 | 0.332 | 0.268 | 0.422 | 0.306 | 0.795 | 0.507 |
| | 24 | 0.421 | 0.312 | 0.421 | 0.298 | 0.423 | 0.302 | 0.424 | 0.303 | 0.565 | 0.379 | 0.442 | 0.316 | 1.267 | 0.750 |
| WTH | 1 | 0.162 | 0.216 | 0.174 | 0.235 | 0.179 | 0.244 | 0.180 | 0.244 | 0.177 | 0.240 | 0.206 | 0.276 | 0.426 | 0.458 |
| | 24 | 0.188 | 0.276 | 0.287 | 0.351 | 0.291 | 0.355 | 0.293 | 0.356 | 0.301 | 0.363 | 0.308 | 0.367 | 0.370 | 0.417 |
| | 48 | 0.223 | 0.301 | 0.294 | 0.359 | 0.297 | 0.361 | 0.297 | 0.363 | 0.323 | 0.382 | 0.302 | 0.362 | 0.367 | 0.419 |
| S-A | 1 | 1.391 | 0.929 | 2.334 | 1.181 | 2.482 | 1.213 | 2.372 | 1.157 | 2.321 | 1.144 | 2.668 | 1.216 | 3.690 | 1.410 |
| | 24 | 1.299 | 0.904 | 3.598 | 1.439 | 3.662 | 1.450 | 3.375 | 1.360 | 3.415 | 1.366 | 3.904 | 1.491 | 3.657 | 1.426 |
| S-G | 1 | 1.760 | 1.038 | 2.335 | 1.181 | 2.482 | 1.213 | 2.476 | 1.212 | 2.428 | 1.199 | 2.927 | 1.304 | 4.024 | 1.501 |
| | 24 | 1.299 | 0.904 | 3.598 | 1.439 | 3.662 | 1.450 | 3.667 | 1.489 | 3.829 | 1.479 | 3.904 | 1.491 | 3.657 | 1.426 |

*FIG. 7*

(a) Prediction from Time *t* = 900

(b) Prediction from Time *t* = 5900

SYSTEMS AND METHODS FOR ONLINE TIME SERIES FORECASTING

CROSS REFERENCE(S)

The instant application is a nonprovisional of and claim priority under 35 U.S.C. 119 to U.S. provisional application No. 63/305,145, filed Jan. 31, 2022, which is hereby expressly incorporated by reference herein in its entirety.

TECHNICAL FIELD

The embodiments relate generally to machine learning systems, and more specifically to online time series forecasting.

BACKGROUND

Deep neural network models have been widely used in time series forecasting. For example, learning models may be used to forecast time series data such as continuous market data over a period of time in the future, weather data, and/or the like. Existing deep models adopt batch-learning for time series forecasting tasks. Such models often randomly sample look-back and forecast windows during training and freeze the model during evaluation, breaking the time varying (non-stationary) nature of time series.

Therefore, there is a need for an efficient and adaptive deep learning framework for online time forecasting.

BRIEF DESCRIPTION OF THE DRAWINGS

FIG. 1 is a simplified diagram illustrating an example structure of the FSNet framework for forecasting a time series, according to embodiments described herein.

FIG. 2 is a simplified diagram illustrating an example structure of a TCN layer (block) of the FSNet framework described in FIG. 1, according to embodiments described herein.

FIG. 3 is a simplified diagram illustrating an example structure of the dilated convolution layer in the TCN layer (block) described in FIG. 2, according to embodiments described herein.

FIG. 5 is a simplified pseudo code segment for a fast and slow learning network implemented at the FSNet framework described in FIGS. 1-3, according to embodiments described here.

FIG. 6 is a simplified logic flow diagram illustrating an example process corresponding to the pseudo code algorithm in FIG. 5, according to embodiments described herein.

FIGS. 7-9 are example data charts and plots illustrating performance of the FSNet in example data experiments, according to embodiments described herein.

Figure 4:
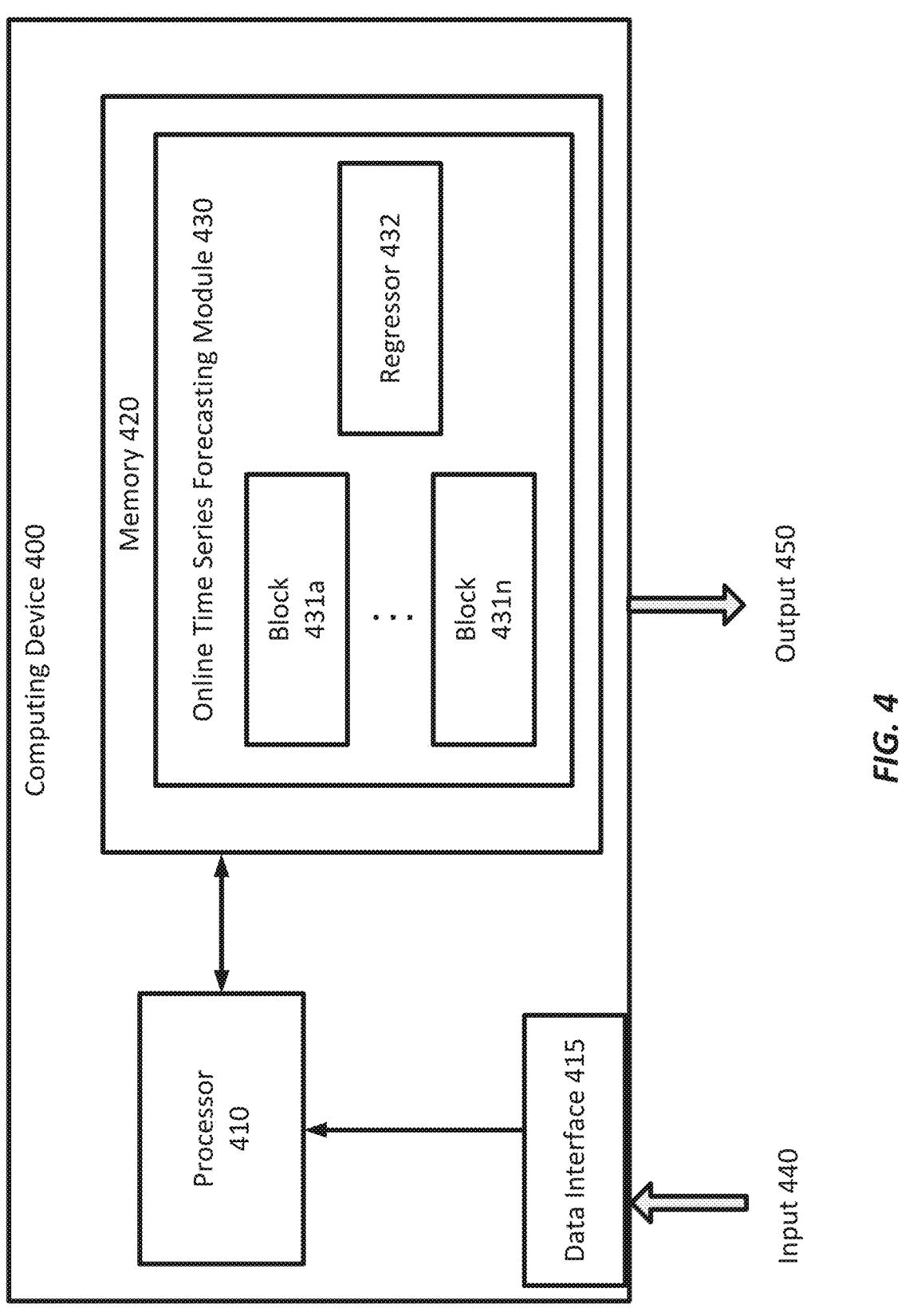
FIG. 4 is a simplified diagram of a computing device that implements the FSNet framework, according to some embodiments described herein.

In the figures, elements having the same designations have the same or similar functions.

DETAILED DESCRIPTION

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

A time series is a set of values that correspond to a parameter of interest at different points in time. Examples of the parameter can include prices of stocks, temperature measurements, and the like. Time series forecasting is the process of determining a future datapoint or a set of future datapoints beyond the set of values in the time series. Time series forecasting of dynamic data via deep learning remains challenging.

Embodiments provide a framework combining fast and slow learning Networks (referred to as "FSNet") to train deep neural forecasters on the fly for online time-series fore-casting. FSNet is built on a deep neural network backbone (slow learner) with two complementary components to facilitate fast adaptation to both new and recurrent concepts. To this end, FSNet employs a per-layer adapter to monitor each layer's contribution to the forecasting loss via its partial derivative. The adapter transforms each layer's weight and feature at each step based on its recent gradient, allowing a fine grain per-layer fast adaptation to optimize the current loss. In addition, FSNet employs a second and complementary associative memory component to store important, recurring patterns observed during training. The adapter interacts with the memory to store, update, and retrieve the previous transformations, facilitating fast learning of such patterns.

In this way, the FSNet framework can adapt to the fast-changing and the long-recurring patterns in time series. Specifically, in FSNet, the deep neural network plays the role of neocortex while the adapter and its memory play act as a hippocampus component.

FSNet Framework Overview

FIG. 1 is a simplified diagram illustrating an example structure of the FSNet framework 100 for forecasting a time series, according to embodiments described herein.

The FSNet framework 100 comprises a plurality of convolution blocks 104*a-n* connected to a regressor 105. The FSNet framework 100 may receive time series data 102, denoted by $\chi=(x_1, \ldots, x_T)\in \mathbb{R}^{T\times n}$ as a times series of T observations each having n dimensions, from an input interface such as a memory or a network adapter. In some embodiments, the time series data 102 may be data in a look back window of length e starting at time i: $\chi_{i,e}=(x_i, \ldots, x_{i+e})$. The model 100 may use a look back window based on the availability of memory in such as GPU memory based on the size of the time series data or based on the seasonality of the data and the like. The model 100 may generate an online forecast 106 predicting the next H-steps of the times series based on the input time series data 102, e.g., $f_\omega(\chi_{i,H})=(x_{i+e+1} \cdots x_{i+e+H})$, where w denotes the parameter of the forecasting model. Here, a pair of lookback window and forecast window data are considered as a training sample. For multiple step forecasting (H>1), a linear regressor 105 is employed to forecast all H steps in the horizons simultaneously.

In one embodiment, FSNet framework 100 may include a temporal convolutional neural network (TCN) backbone having L layers (e.g., the blocks 1-L 104*a-n*) with parameters $$\theta = \{\theta_l\}_{l=1}^L.$$

The TCN backbone 104*a-n* may implement a deep learning algorithm (that learns slowly online and is a deep neural network) which receives an input such as a time series data 102, assigns importance (learnable weights and biases) to various aspects/objects in the time series data 102 and differentiates various aspects/objects in the time series data 102 from the other aspects/objects in the time series data 102. The TCN backbone 104*a-n* may extract a time-series feature representation from the time series data 102.

Based on the TCN backbone 104*a-n*, the FSNet framework 100 further includes two complementary components: a per-layer adapter $\phi_l$ (shown at 315 in FIG. 3) for each TCN layer 104*a-n* and a per-layer associate memory $M_l$ (shown at 318 in FIG. 3) for each TCN layer 104*an*. Thus, the total trainable parameters for the framework is $\omega=\{\theta_l,\phi_l\}$ and the total associate memory is $M=\{M_l\}_{l=1, \ldots, L}$.

FIG. 2 is a simplified diagram illustrating an example structure of a TCN layer (block) 104*a* of the FSNet framework described in FIG. 1, according to embodiments described herein. At each TCN layer (block), e.g., 104*a*, the block input 202 may be processed by a number of dilated convolution layers 204, 2-6, and the convoluted output is added to the original block input 202 to generate block output 208. It is noted that while two dilated convolution layers 204 and 206 are shown in FIG. 2 for illustrative purpose only, any other number of dilated convolution layers may be used in a TCN block.

In one embodiment, each TCN block 104*a* may rely on its adapter 315 and associative memory 318 to quickly adapt to the changes in time series data 102 or learn more efficiently with limited data. Each block or layer 104*a*-104*n* may adapt independently rather than restricting the adaptation to the depth of the network, i.e., gradient descent over the depth of the network 104*a-n*. The partial derivative $\nabla_{\theta_l}\ell$ for each layer 104*a-n* characterizes the contribution of the convolutional layer $\theta_l$ 104*a-n* to the forecasting loss $\ell$. The $\nabla_{\theta_l}\ell$ may be used to update the l-th layer $\theta_l$ In some embodiments, a gradient associated with each convolutional layer may be computed based on a partial derivative $\nabla_{\theta_l}\ell$. Such gradient may be further smoothed out using the exponential moving (EMA) average within the dilated convolution 204 or 206 as described in relation to FIG. 3.

Therefore, each convolution filter stack is accompanied by an adapter and an associative memory. At each layer, the adapter receives the gradient EMA and interacts with the memory and convolution filter accordingly, as further illustrated in relation to FIG. 3.

FIG. 3 is a simplified diagram illustrating an example structure of the dilated convolution layer 204 (or 206) in the TCN layer (block) 104*a* described in FIG. 2, according to embodiments described herein. The dilated convolution layer 204 may comprise convolution filters 310, a per-layer adapter 315, a per-layer memory 318. Input 202 to the dilated convolution layer 204 may be fed to the convolution filters 310, which in turn computes the exponential moving average (EMA) 313 of the TCN backbone's gradients. Specifically, because a gradient of a single sample can highly fluctuate and introduce noises to the adaptation parameters, EMA is used to smooth out online training's noises by:

$$\hat{g}_l \leftarrow \gamma\hat{g}_l + (1-\gamma)g_l^t \tag{1}$$

where $$g_l^t$$

denotes the gradient of the l-th layer at time t and $\hat{g}_l$ denotes the EMA gradient. In this way, the fast adapter 315 may receive the EMA gradient $\hat{g}_l$ as input and maps it to the adaptation coefficients $u_l$, as shown at 316.

In some embodiments, the fast adapter 315 may use the element-wise transformation as the adaptation process due to its efficiency for continual learning. The resulting adaptation parameter $u_l$ 316 may include two components: (i) a weight adaptation parameter $\alpha_l$; and (ii) a feature adaptation parameter $\beta_l$, concatenated together as $u_l=[\alpha_l;\beta_l]$. In some embodiments, the fast adapter 315 may absorb the bias transformation parameter into $\alpha_l$ for brevity.

In one embodiment, the adaptation for a layer $\theta_l$ may involves a weight adaptation and a feature adaptation, as shown at 319. First, the weight adaptation parameter $\alpha_l$ acts on the corresponding weight of the backbone network via an element-wise multiplication as $$\tilde{\theta}_l = \text{tile } (\alpha_l) \odot \theta_l, \alpha_l \in \mathbb{R}^C, \theta_l \in \mathbb{R}^{I \times C \times L} \tag{2}$$

wherein, $\theta$ is a stack of l features maps of C channels and length L, $\theta_l$ denotes the adapted weight, tile $(\alpha_l)$ denotes that the weight adaptor is applied per-channel on all filters via a tile function, and $\odot$ denotes the elementwise multiplication.

Similarly, a feature adaptation component $\beta_l$ of the gradient, wherein the feature adaptation parameter changes the convolutional layer feature map based on an element-wise multiplication between the feature adaptation component and the first convolutional layer feature map. For example, the feature adaptation $\beta_l$ also interacts with the output feature map $h_l$ to generate the output 322 as $$\tilde{h}_l = \text{tile } (\beta_l) \odot h_l, \beta_l, \in \mathbb{R}^C, h_l \in \mathbb{R}^{I \times C \times L} \tag{3}$$

In this way, the convolutional layer $\theta_l$ may be updated based on the weight adaption component $\alpha_l$ and the feature adaptation component $\beta_l$.

In some embodiments, the gradient may be directly mapped to the per-element adaptation parameter and this may result in a very high dimensional mapping.

In some embodiments, a chunking operation, denoted as $\Omega(\bullet;\phi_l)$, may be implemented to split the gradient into equal size chunks and then maps each chunk to an element of the adaptation parameter. Specifically, the chunking operation may be implemented as (1) flattening the gradient EMA of a corresponding block of the TCN model 120 into a vector; (2) splitting the gradient vector into d chunks; (3) mapping each chunk to a hidden representation; and (4) mapping each hidden representation to a coordinate of the target adaptation parameter u. For example, by using a vectorizing operation (vec $(\bullet)$) that flattens a tensor into a vector, a splitting operation (e,B) splitting a vector e into B segments, each has size dim (e)/B, the backbone's layer EMA gradient 313 of the TCN backbone to an adaptation coefficient $u \in \mathbb{R}^d$ via the chunking process as:

$$\hat{g}_l \leftarrow vec(\hat{g}_l) \tag{4}$$

$$[b_1, b_2, \ldots b_d] \leftarrow reshape(\hat{g}_l; d)$$

$$[h_1, h_2, \ldots h_d] \leftarrow W_\phi^{(1)}b_1, W_\phi^{(1)}b_2, \ldots, W_\phi^{(1)}b_d]$$

$$[u_1, u_2, \ldots u_d] \leftarrow W_\phi^{(2)}h_1, W_\phi^{(2)}h_2, \ldots, W_\phi^{(2)}h_d]$$

where the $$W_\phi^{(1)} \text{ and } W_\phi^{(2)}$$

are the first and second weight matrix of the adapter. In this way, the adaptation may be applied per-channel, which greatly reduces the memory overhead, offers compression and generalization.

In summary, let $\circledast$ denotes the convolution operation, at step t, the FSNet adapter may use a fast adaptation procedure for the l-th layer is summarized as:

$$[\alpha_l, \beta_l] = u_l, \text{ where } u_l = \Omega(\hat{g}_l; \phi_l) \tag{5}$$

$$\tilde{\theta}_l = tile\ (\alpha_l) \odot \theta_l$$

$$\tilde{h}_l = tile\ (\beta_l) \odot h_l, \text{ where } h_l = \tilde{\theta}_l \circledast \tilde{h}_{l-1}.$$

In one embodiment, in time series, old patterns may reappear in the future, and it is beneficial to recall similar knowledge in the past to facilitate learning further. While storing the original data can alleviate this problem, it might not be applicable in many domains due to privacy concerns. Therefore, an associative memory 318 may be implemented to store the adaptation coefficients of repeating events encountered during learning. While the adapter 315 can handle fast recent changes over a short time scale, recurrent patterns are stored in the memory 318 and then retrieved when they reappear in the future. For this purpose, each adapter 315 is equipped with an associate memory 318, denoted by $\mathcal{M}_l \in \mathbb{R}^{N \times d}$ where d denotes the dimensionality of $u_l$, and N denotes the number of elements. The associate memory 318 only sparsely interacts with the adapter to store, retrieve, and update such important events.

Specifically, as interacting with the memory 318 at every step can be expensive and susceptible to noises, memory interaction may be triggered only when a substantial change in the representation is detected. Interference between the current and past representations can be characterized in terms of a dot product between the gradients. Therefore, a cosine similarity between the recent and longer term gradients may be computed and monitored to trigger the memory interaction when their interference fails below a threshold, which could indicate the pattern has changed significantly. To this end, in addition to computing the gradient EMA $\hat{g}_l$ (313), a second gradient EMA $$\hat{g}_l'$$

with a smaller coefficient $\gamma' < \gamma$ is computed and their cosine similarity to trigger the memory interaction as:

$$\text{Trigger if:} \cos(\hat{g}_l, \hat{g}_l') = \frac{\hat{g}_l \cdot \hat{g}_l'}{\|\hat{g}_l\|\|\hat{g}_l\|} < -\tau \tag{6}$$

where $\tau > 0$ is a hyper-parameter determining the significant degree of interference. Moreover, r may be set to a relatively high value (e.g., 0.7) so that the memory only remembers significant changing patterns, which could be important and may reappear. For example, example EMA hyperparameter may be set as: adapter's EMA coefficient $\gamma=0.9$, gradient EMA for triggering the memory interaction $\gamma'=0.3$, memory triggering threshold $\tau=0.75$.

In one embodiment, when the current adaptation parameter may not capture the whole event, which could span over a few samples, memory read and write operations may be performed using the adaptation parameter's EMA (with coefficient $\gamma'$) to fully capture the current pattern. The EMA of $u_l$ is calculated in the same manner as $\hat{g}_l$. When a memory interaction is triggered, the adapter queries and retrieves the most similar transformations in the past via an attention read operation, which is a weighted sum over the memory items:

1. Attention calculation: $r_l = softmax\ (\mathcal{M}_l\ \hat{u}_l)$;
2. Top-k selection:

$$r_l^{(k)} = Top\ K(r_l);$$

3. Retrieval:

$$\tilde{u}_l = \sum_{i=1}^K r_l^{(k)}[i]\mathcal{M}_i[i],$$

where $r^{(k)}[i]$ denotes the i-th element of $$r_l^{(k)}$$

and $\mathcal{M}_l$ [i] denotes the i-th row of $\mathcal{M}_l$. As the memory could store conflicting patterns, sparse attention is applied by retrieving the top-k most relevant memory items, e.g., k=2. The retrieved adaptation parameter characterizes old experiences in adapting to the current pattern in the past and can improve learning at the present time by weighted summing with the current parameters as $$u_l \leftarrow \tau u_l + (1 - \tau)\tilde{u}_t, \tag{7}$$

where the same threshold value r can be used to determine the sparse memory interaction and the weighted sum of the adaptation parameter. Then a write operation is performed to update and accumulate the knowledge stored in $\mathcal{M}_l$:

$$\mathcal{M}_l \leftarrow \tau\mathcal{M}_l + (1 - \tau)\hat{u}_l \otimes r_l^{(k)} \tag{8}$$

$$\mathcal{M}_l \leftarrow \frac{\mathcal{M}_l}{m(1, \|\mathcal{M}_l\|_2)}$$

where $\otimes$ denotes the outer-product operator, which allows to efficiently write the new knowledge to the most relevant locations indicated by $$r_l^{(k)}.$$

The memory is then normalized to avoid its values scaling exponentially.

In one embodiment, the FSNet framework described in relation to FIGS. 1-3 is suitable for the task-free, online continual learning scenario because there is no need to detect when tasks switch explicitly. Instead, the task boundaries definition can be relaxed to allow the model to improve its learning on current samples continuously.

Computing Environment

FIG. 4 is a simplified diagram of a computing device that implements the FSNet framework, according to some embodiments described herein. As shown in FIG. 4, computing device 400 includes a processor 410 coupled to memory 420. Operation of computing device 400 is controlled by processor 410. And although computing device 400 is shown with only one processor 410, it is understood that processor 410 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 400. Computing device 400 may be implemented as a stand-alone subsystem, as a board added to a computing device, and/or as a virtual machine.

Memory 420 may be used to store software executed by computing device 400 and/or one or more data structures used during operation of computing device 400. Memory 420 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 410 and/or memory 420 may be arranged in any suitable physical arrangement. In some embodiments, processor 410 and/or memory 420 may be implemented on a same board, in a same package (e.g., system-in-package), on a same chip (e.g., system-on-chip), and/or the like. In some embodiments, processor 410 and/or memory 420 may include distributed, virtualized, and/or containerized computing resources. Consistent with such embodiments, processor 410 and/or memory 420 may be located in one or more data centers and/or cloud computing facilities.

In some examples, memory 420 may include non-transitory, tangible, machine readable media that includes executable code that when run by one or more processors (e.g., processor 410) may cause the one or more processors to perform the methods described in further detail herein. For example, as shown, memory 420 includes instructions for an online time series forecasting module 430 that may be used to implement and/or emulate the systems and models, and/or to implement any of the methods described further herein. In some examples, the online time series forecasting module 430, may receive an input 440, e.g., such as a time-series data in a lookback window, via a data interface 415. The data interface 415 may be any of a user interface that receives uploaded time series data, or a communication interface that may receive or retrieve a previously stored sample of lookback window and forecasting window from the database. The times series forecasting module 430 may generate an output 450, such as a forecast to the input 440.

In some embodiments, the time series forecasting module 430 may further include a series of TCN blocks 431a-n (similar to 104a-n shown in FIG. 1) and a regressor 432 (similar to 105 shown in FIG. 1). In one implementation, the time series forecasting module 430 and its submodules 431-432 may be implemented via software, hardware and/or a combination thereof.

Some examples of computing devices, such as computing device 400 may include non-transitory, tangible, machine readable media that include executable code that when run by one or more processors (e.g., processor 410) may cause the one or more processors to perform the processes of methods discussed throughout the disclosure. Some common forms of machine-readable media that may include the processes of methods are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Example Workflows

FIG. 5 is a simplified pseudo code segment for a fast and slow learning network implemented at the FSNet framework described in FIGS. 1-3, according to embodiments described here. For example, for the stack of L layers (e.g., 104a-n in FIG. 1), forward computation may be performed to compute the adaptation parameter comprising the weight adaptation component $\alpha_l$ and the feature adaptation component $\beta_l$ at each layer. Memory read and write operation may be performed via the chunking process and the adaptation parameter may be updated by a weighted sum of the current and past adaptation parameters.

Next, the weight adaptation and feature adaptation may be performed according to Eq. (5). After updating the adaptation parameters through forward computation over L layers, forecast data can be generated via the regressor (e.g., 105 in FIG. 1). The forecast data is then compared with the ground-truth future data from the training sample to compute the forecast loss, which is then used to update the stack of L layers via backpropagation. The regressor may also be updated via stochastic gradient descent (SGD). The adaptation parameters and EMA adaptation parameters are then updated backwardly.

FIG. 6 is a simplified logic flow diagram illustrating an example process 600 corresponding to the pseudo code algorithm in FIG. 5, according to embodiments described herein. One or more of the processes of method 600 may be implemented, at least in part, in the form of executable code stored on non-transitory, tangible, machine-readable media that when run by one or more processors may cause the one or more processors to perform one or more of the processes. In some embodiments, method 600 corresponds to the operation of the FSNet framework 100 (FIG. 1) for forecasting time series data at future timestamps in a dynamic system.

At step 602, a time series dataset that includes a plurality of datapoints corresponding to a plurality of timestamps within a lookback time window (e.g., 102 in FIG. 1) may be received via a data interface (e.g., 415 in FIG. 4).

At step 604, a convolutional layer (e.g., block 104a in FIGS. 1-2) from a stack of convolutional layers (e.g., Blocks 104a-n in FIG. 1) may compute a first gradient based on exponential moving average of gradients corresponding to the respective convolutional layer, e.g., according to Eq. (1).

At step 606, a first adaptation parameter u corresponding to the convolutional layer may be determined by mapping portions of the first gradient to elements of the first adaptation parameter. For example, the first adaptation parameter comprises a first weight adaptation component $\alpha_l$ and a first feature adaptation component $\beta_l$.

At step 608, for at least one convolutional layer in a temporal convolutional neural network, a layer forecasting loss indicative of a loss contribution of the respective convolutional layer to an overall forecasting loss according to the plurality of datapoints may be optionally determined, based on the plurality of datapoints. For example, the layer forecasting loss may be computed via the partial derivative $\nabla_{\theta_l} \ell$.

At step 610, the at least one convolutional layer may be optionally updated based on the layer forecasting loss. In this way, each layer may be monitored and modified independently to learn the current loss by learning through the layer forecasting loss.

At step 612, a cosine similarity between the first gradient of the updated convolutional layer and a longer-term gradient associated with the at least one first convolutional layer may be computed, e.g., according to Eq. (6).

At step 614, when the cosine similarity is greater than a pre-predefined threshold, method 600 proceeds to step 616 to perform a chunking process for memory read and write. Specifically, at step 616, a current adaptation parameter is retrieved from an indexed memory (e.g., 318 in FIG. 3) corresponding to the convolutional layer. At step 618, content stored at the indexed memory (e.g., 318 in FIG. 3) is updated based on the current adaptation parameter and the first adaptation parameter. At step 620, the first adaptation parameter is updated by taking a weighted average with the retrieved current adaptation parameter.

At step 622, an adapted layer parameter $\tilde{\theta}_l$ is computed based on the first weight adaptation component $\alpha_l$ and a layer parameter $\theta_l$ corresponding to the first layer, e.g., according to Eq. (5).

At step 624, a feature map $h_l$ of the first convolutional layer is generated with the first feature adaptation component $\beta_l$. For example, the first feature map is a convolution of the adapted layer parameter and a previous adapted feature map from a preceding layer. At step 626, an adapted feature map $\tilde{h}_l$ is computed based on the first feature adaptation component $\beta_l$ and a first feature map $h_l$ of the first convolutional layer.

At step 628, a regressor (e.g., 105 in FIG. 1) may generate time series forecast data corresponding to a future time window based on a final feature map output from the stack of convolutional layers corresponding to the time series data within the lookback time window.

At step 630, a forecast loss may be computed based on the generated time series forecast data and ground-truth data corresponding to the future time window.

The stack of convolutional layers and the regressor may then be updated based on the forecast loss via backpropagation. At step 632, the regressor may be updated via stochastic gradient descent. At step 634, the gradient and the adaptation parameter of each layer of the stack may then be updated backwardly.

Example Performance

Data experiments have been carried out to verify following hypotheses: (i) FSNet facilitates faster adaptation to both new and recurring concepts compared to existing strategies; (ii) FSNet achieves faster and better convergence than other methods; and (iii) modeling the partial derivative is the key ingredients for fast adaptation.

Specifically, a wide range of time series forecasting datasets have been used in the data experiments: (i) ETT1 (Zhou et al., Informer: Beyond efficient transformer for long sequence time-series forecasting, in Proceedings of AAAI, 2021) records the target value of "oil temperature" and 6 power load features over a period of two years. The ETTh2 and ETTm1 benchmarks are used, where the observations are recorded hourly and in 15-minutes intervals respectively. (ii) ECL (Electricity Consuming Load)2 dataset collects the electricity consumption of 321 clients from 2012 to 2014. (iii) Traffic3 dataset records the road occupancy rates at San Francisco Bay area freeways. (iv) Weather4 dataset records 11 climate features from nearly 1,600 locations in the U.S. in an hour intervals from 2010 to 2013.

In addition, two synthetic datasets are constructed to explicitly test the model's ability to deal with new and recurring concept drifts. A task may be synthesized by sampling 1,000 samples from a first-order autoregressive process with coefficient $\varphi$ $AR_{\varphi}(1)$, where different tasks correspond to different p values. The first synthetic data, S-Abrupt contains abrupt, and recurrent concepts where the samples abruptly switch from one AR process to another by the following order: AR0.1(1), AR0.4(1), AR0.6(1), AR0.1 (1), AR0.3(1), AR0.6(1). The second data, S-Gradual contains gradual, incremental shifts, where the shift starts at the last 20% of each task. In this scenario, the last 20% samples of a task is an averaged from two AR process with the order as above.

At implementation, data is split into warm-up and online training phases by the ratio of 25:75 and consider the TCN backbone for experiments, except the Informer baseline. Optimization details in Zhang et al., Informer: Beyond efficient transformer for long sequence time-series forecasting, in Proceedings of AAAI, 2021, by optimizing the 12 (MSE) loss with the AdamW optimizer. Both the epoch and batch size are set to one to follow the online learning setting. A fair comparison is implemented by making sure that all baselines use the same total memory budget as FSNet, which includes three-times the network sizes: one working model and two EMA of its gradient. Thus, for ER, MIR, and DER++, an episodic memory to store previous samples to meet this budget. For the remaining baselines, the backbone size can be increased instead. Lastly, in the warm-up phase, the mean and standard deviation are calculated to normalize online training samples and perform hyper-parameter cross-validation. For all benchmarks, the look-back window length is set to be 60 and the forecast horizon of H=1. The model's ability to forecast longer horizons is tested by varying H∈{1, 24, 48}.

A suite of training from both continual learning and time series forecasting are adopted for comparison. First, the OnlineTCN strategy that simply trains continuously (described in Zinkevich, Online convex programming and generalized infinitesimal gradient ascent, in Proceedings of the 20th international conference on machine learning (icml-03), pages 928-936, 461, 2003. Second, the Experience Replay ER strategy (described in Lin, Self-improving reactive agents based on reinforcement learning, planning and teaching, Machine learning, 8(3-4):293-321, 1992) where a buffer is employed to store previous data and interleave old samples during the learning of newer ones. Three recent advanced variants of ER. First, TFCL (Aljundi et al., Task-free continual learning, in Proceedings of the IEEE/CVF Conference on Computer Vision and Pattern Recognition, pages 11254-11263, 325, 2019) introduces a task-boundaries detection mechanism and a knowledge consolidation strategy by regularizing the networks' outputs. Second, MIR (Aljundi et al., Online continual learning with maximal interfered retrieval. Advances in Neural Information Processing Systems, 32:11849-11860, 2019) replace the random sampling in ER by selecting samples that cause the most forgetting. Lastly, DER++(Buzzega et al., Dark experience for general continual learning: a strong, simple baseline, in 34th Conference on Neural Information Processing Systems (NeurIPS 2020), 2020) augments the standard ER with a knowledge distillation strategy (described in Hinton et al., Distilling the knowledge in a neural network. arXiv preprint arXiv:1503.02531, 2015). ER and its variants are strong baselines in the online setting since they enjoy the benefits of training on mini-batches, which greatly reduce noises from singe samples and offer faster, better convergence (see Bottou et al., Online learning and stochastic approximations, Online learning in neural networks, 17(9): 142, 1998). While the aforementioned baselines use a TCN backbone, Informer, the time series forecasting method based on the transformer architecture (Vaswani et al., Attention is all you need. Advances in neural information processing systems, 30, 2017) is also included.

First, the Online Gradient Descent (OGD) (described in Zinkevich, Online convex and generalized infinitesimal gradient ascent, in proceedings of the $20^{th}$ international conference on machine learning, pp. 928-936, 2003) strategy that simply trains continuously. OGD (L), a large variant of OGD with twice the TCN's filters per layer is also included, resulting in a roughly twice number of parameters5. Another baseline includes Experiment Replay (described in Chaudhry et al., On tiny episodic memories in continual learning, arXiv preprint arXiv:1902.10486, 2019) strategy where a buffer is employed to store previous data and interleave old samples during the learning of newer ones. Another baseline includes DER++(Buzzega et al., Dark experience for general continual learning: a strong, simple baseline, in proceedings of 34th Conference on Neural Information Processing Systems (NeurIPS 2020), 2020) which further adds a knowledge distillation (described in Hinton et al., Distilling the knowledge in a neural network, arXiv preprint arXiv:1503.02531, 2015) loss to ER. ER and DER++ are strong baselines in the online setting since they enjoy the benefits of training on mini-batches, which greatly re-duce noises from singe samples and offers faster, better convergence.

FIG. 7 reports cumulative mean-squared errors (MSE) and mean-absolute errors (MAE) at the end of training. It is observed that ER and DER++ are strong competitors and can significantly im-prove over the OGD strategies. However, such methods still cannot work well under multiple task switches (S-Abrupt). Moreover, no clear task boundaries (S-Gradual) presents an even more challenging problem and increases most models' errors. On the other hand, FSNet shows promising results on all datasets and outperforms most competing baselines across different forecasting horizons. Moreover, the improvements are significant on the synthetic benchmarks, indicating that LSFNet can quickly adapt to the non-stationary environment and recall previous knowledge, even without clear task boundaries.

Figure 8:
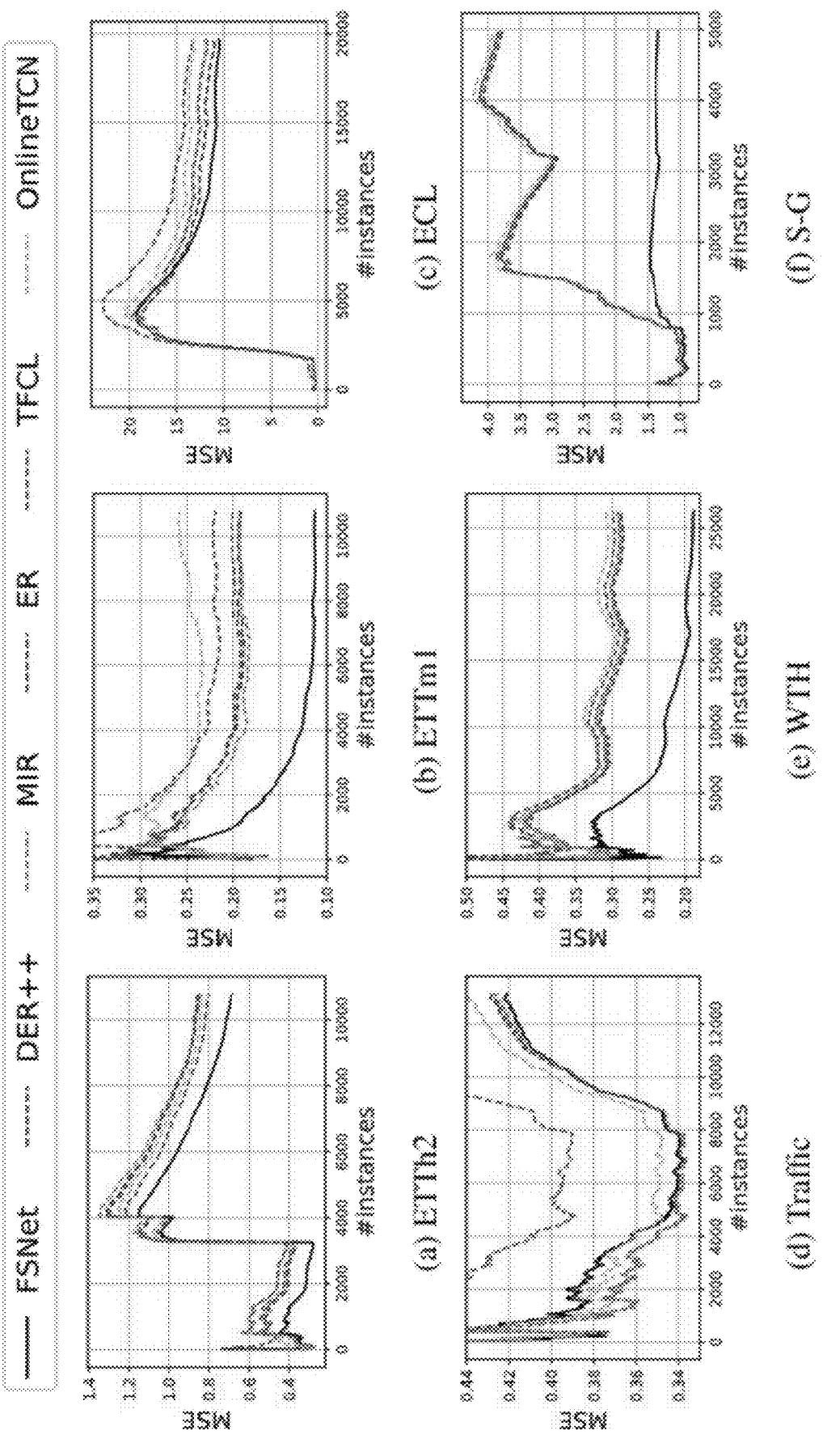

FIG. 8 reports the convergent behaviors on the considered methods. The results show the benefits of ER by offering faster convergence during learning compared to OGD. However, it is important to note that storing the original data may not apply in many domains. On S-Abrupt, most baselines demonstrate the inability to quickly recover from concept drifts, indicated by the increasing error curves. It is also observed that promising results of FSNet on most datasets, with significant improve-ments over the baselines on the ETT, WTH, and S-Abrupt datasets. The ECL dataset is more challenging with missing values (Li et al., 2019) and large magnitude varying within and across dimensions, which may require calculating a better data normalization. While FSNet achieved encouraging results on ECL, handling the above challenges can further improve its performance. Overall, the results shed light on the challenges of online time series forecasting and demonstrate promising results of FSNet.

Figure 9:
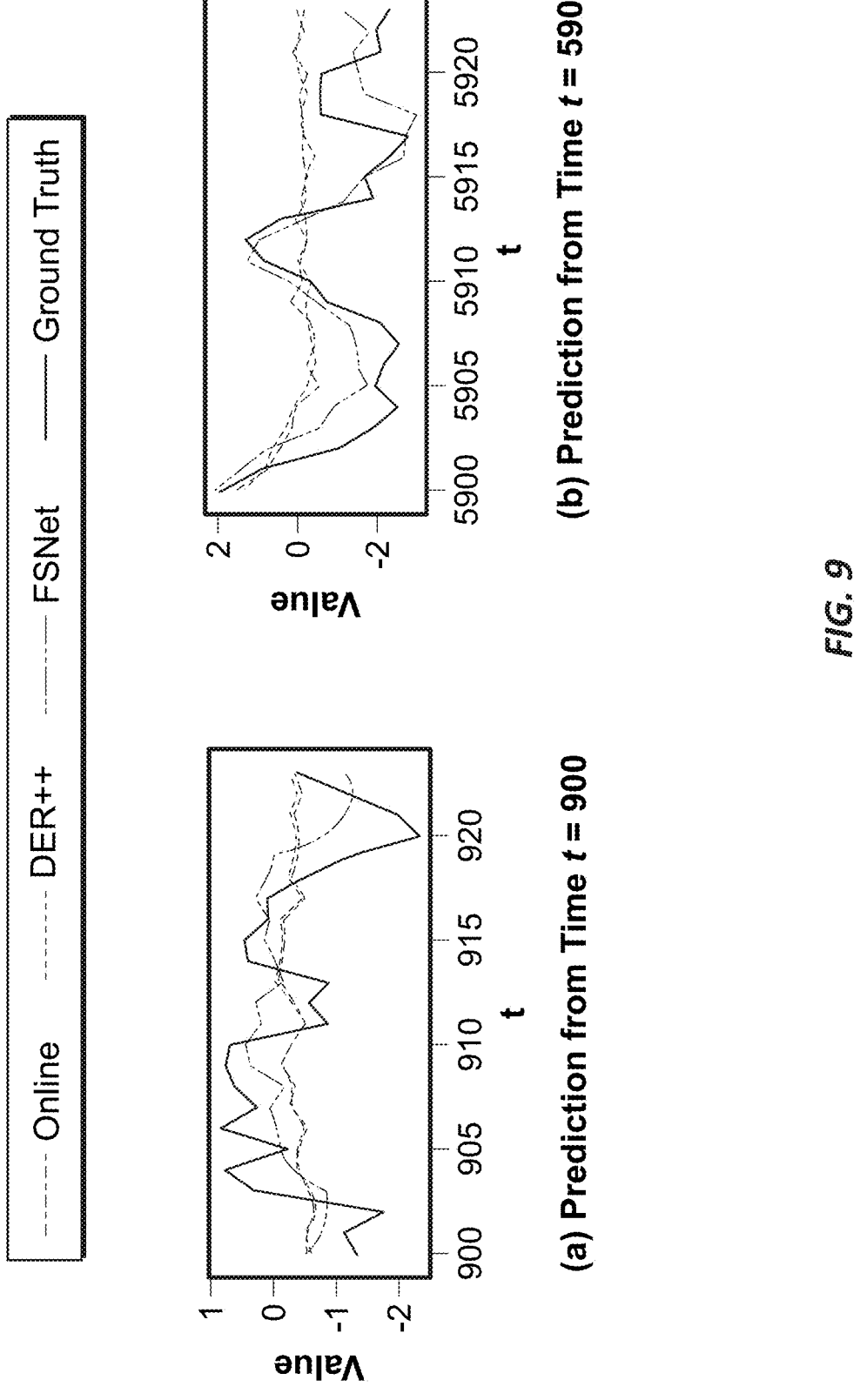

The model's prediction quality on the S-Abrupt is visualized as shown in FIG. 8, as it is a univariate time series. The remaining real-world datasets are multivariate are challenging to visualize. Particularly, the model's forecasting at two-time points is plotted: at t=900 and the end of learning, t=5900 in FIG. 9. With the limited samples per task and the presence of multiple concept drifts, the standard online optimization collapsed to a naive solution of predicting random noises around zero. However, FSNet can successfully capture the time series' patterns and provide better predictions.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method of forecasting time series data at future timestamps in a dynamic system, the method comprising:

receiving, via a data interface, a time series dataset that includes a plurality of datapoints corresponding to a plurality of timestamps within a lookback time window;

computing, at a first convolutional layer from a stack of convolutional layers, a first gradient based on an exponential moving average of gradients corresponding to the first convolutional layer;

determining first adaptation parameters corresponding to the first convolutional layer based on mapping portions of the first gradient to elements of the first adaptation parameters, wherein the first adaptation parameters comprise a first weight adaptation component and a first feature adaptation component;

computing an adapted feature map based at least in part on the first adaptation parameters and a previous adapted feature map from a preceding convolutional layer;

generating, via a regressor, time series forecast data corresponding to a future time window based on a final feature map output from the stack of convolutional layers corresponding to the time series data within the lookback time window;

for at least one convolutional layer in a temporal convolutional neural network:

determining, based on the plurality of datapoints, a layer forecasting loss indicative of a loss contribution of the respective convolutional layer to an overall forecasting loss according to the plurality of datapoints, and updating the at least one convolutional layer based on the layer forecasting loss;

computing a cosine similarity between the first gradient of the updated convolutional layer and a longer-term gradient associated with the at least one convolutional layer;

in response to determining that determination that the cosine similarity is greater than a pre-predefined threshold:

retrieving, from an indexed memory corresponding to the first convolutional layer, a current adaptation parameter, updating content stored at the indexed memory based on the current adaptation parameter and the first adaptation parameter, and updating the first adaptation parameters by taking a weighted average with the retrieved current adaptation parameter;

computing a forecast loss based on the generated time series forecast data and ground-truth data corresponding to the future time window; and updating the stack of convolutional layers based on the forecast loss via backpropagation.

2. The method of claim 1, further comprising:

computing an adapted layer parameter based on generating a first adapted weight based on the first weight adaptation component and a layer parameter corresponding to the first layer; and generating a feature map of the first convolutional layer with the first feature adaptation component.

3. The method of claim 2, wherein the adapted feature map is computed based on the first feature adaptation component and a first feature map of the first convolutional layer, and wherein the first feature map is a convolution of the adapted layer parameter and a previous adapted feature map from a preceding layer.

4. The method of claim 3, wherein the stack of convolutional layers and the regressor are updated by:

updating the regressor via stochastic gradient descent; and updating, at the first convolutional layer, the first gradient and the first adaptation parameter.

5. The method of claim 1, further comprising:

in response to determining that determination that the cosine similarity is greater than a pre-predefined threshold:

trigger a memory read or write operation that captures a current pattern of gradients.

6. The method of claim 5, wherein the current pattern is captured by:

computing attentions based on a current content of the memory and a current adaptation parameter;

selecting a set of top relevant attentions from the computed attentions; and updating the current adaptation parameter by taking a weighted sum of the current content of the memory weighted by the set of top relevant attentions.

7. The method of claim 6, further comprising:

performing a write operation to update and accumulate the current content of the memory based on the updated current adaptation parameter.

8. A system for forecasting time series data at future timestamps in a dynamic system, the system comprising:

a data interface that receives a time series dataset that includes a plurality of datapoints corresponding to a plurality of timestamps within a lookback time window;

a memory that stores a plurality of processor-executable instructions; and a processor that reads from the memory and executes the instructions to perform operations comprising:

computing, at a first convolutional layer from a stack of convolutional layers, a first gradient based on an exponential moving average of gradients corresponding to the first convolutional layer;

determining first adaptation parameters corresponding to the first convolutional layer based on mapping portions of the first gradient to elements of the first adaptation parameters, wherein the first adaptation parameters comprise a first weight adaptation component and a first feature adaptation component;

computing an adapted feature map based at least in part on the first adaptation parameters and a previous adapted feature map from a preceding convolutional layer;

generating, via a regressor, time series forecast data corresponding to a future time window based on a final feature map output from the stack of convolutional layers corresponding to the time series data within the lookback time window;

for at least one convolutional layer in a temporal convolutional neural network:

determining, based on the plurality of datapoints, a layer forecasting loss indicative of a loss contribution of the respective convolutional layer to an overall forecasting loss according to the plurality of datapoints, and updating the at least one convolutional layer based on the layer forecasting loss;

computing a cosine similarity between the first gradient of the updated convolutional layer and a longer-term gradient associated with the at least one convolutional layer;

in response to determining that determination that the cosine similarity is greater than a pre-predefined threshold:

retrieving, from an indexed memory corresponding to the first convolutional layer, a current adaptation parameter, updating content stored at the indexed memory based on the current adaptation parameter and the first adaptation parameter, and updating the first adaptation parameters by taking a weighted average with the retrieved current adaptation parameter;

computing a forecast loss based on the generated time series forecast data and ground-truth data corresponding to the future time window; and updating the stack of convolutional layers based on the forecast loss via backpropagation.

9. The system of claim 8, wherein the operations further comprise:

computing an adapted layer parameter based on generating a first adapted weight based on the first weight adaptation component and a layer parameter corresponding to the first layer; and generating a feature map of the first convolutional layer with the first feature adaptation component.

10. The system of claim 9, wherein the adapted feature map is computed based on the first feature adaptation component and a first feature map of the first convolutional layer, and wherein the first feature map is a convolution of the adapted layer parameter and a previous adapted feature map from a preceding layer.

11. The system of claim 10, wherein the stack of convolutional layers and the regressor are updated by:

updating the regressor via stochastic gradient descent; and updating, at the first convolutional layer, the first gradient and the first adaptation parameter.

12. The system of claim 8, wherein the operations further comprise:

in response to determining that determination that the cosine similarity is greater than a pre-predefined threshold:

trigger a memory read or write operation that captures a current pattern of gradients.

13. The system of claim 12, wherein the current pattern is captured by:

computing attentions based on a current content of the memory and a current adaptation parameter;

selecting a set of top relevant attentions from the computed attentions; and updating the current adaptation parameter by taking a weighted sum of the current content of the memory weighted by the set of top relevant attentions.

14. A non-transitory processor-readable storage medium storing processor-readable instructions for forecasting time series data at future timestamps in a dynamic system, the instructions being executed by a processor to perform operations comprising:

receiving, via a data interface, a time series dataset that includes a plurality of datapoints corresponding to a plurality of timestamps within a lookback time window;

computing, at a first convolutional layer from a stack of convolutional layers, a first gradient based on an exponential moving average of gradients corresponding to the first convolutional layer;

determining first adaptation parameters corresponding to the first convolutional layer based on mapping portions of the first gradient to elements of the first adaptation parameters, wherein the first adaptation parameters comprise a first weight adaptation component and a first feature adaptation component;

computing an adapted feature map based at least in part on the first adaptation parameters and a previous adapted feature map from a preceding convolutional layer;

generating, via a regressor, time series forecast data corresponding to a future time window based on a final feature map output from the stack of convolutional layers corresponding to the time series data within the lookback time window;

for at least one convolutional layer in a temporal convolutional neural network:

determining, based on the plurality of datapoints, a layer forecasting loss indicative of a loss contribution of the respective convolutional layer to an overall forecasting loss according to the plurality of datapoints, and updating the at least one convolutional layer based on the layer forecasting loss;

computing a cosine similarity between the first gradient of the updated convolutional layer and a longer-term gradient associated with the at least one convolutional layer;

in response to determining that determination that the cosine similarity is greater than a pre-predefined threshold:

retrieving, from an indexed memory corresponding to the first convolutional layer, a current adaptation parameter, updating content stored at the indexed memory based on the current adaptation parameter and the first adaptation parameter, and updating the first adaptation parameters by taking a weighted average with the retrieved current adaptation parameter;

computing a forecast loss based on the generated time series forecast data and ground-truth data corresponding to the future time window; and updating the stack of convolutional layers based on the forecast loss via backpropagation.

15. The non-transitory processor-readable storage medium of claim 14, further comprising:

computing an adapted layer parameter based on generating a first adapted weight based on the first weight adaptation component and a layer parameter corresponding to the first layer; and generating a feature map of the first convolutional layer with the first feature adaptation component.

16. The non-transitory processor-readable storage medium of claim 15, wherein the adapted feature map is computed based on the first feature adaptation component and a first feature map of the first convolutional layer, and wherein the first feature map is a convolution of the adapted layer parameter and a previous adapted feature map from a preceding layer.

17. The non-transitory processor-readable storage medium of claim 16, wherein the stack of convolutional layers and the regressor are updated by:

updating the regressor via stochastic gradient descent; and updating, at the first convolutional layer, the first gradient and the first adaptation parameter.

18. The non-transitory processor-readable storage medium of claim 14, further comprising:

in response to determining that determination that the cosine similarity is greater than a pre-predefined threshold:

trigger a memory read or write operation that captures a current pattern of gradients.

19. The non-transitory processor-readable storage medium of claim 18, wherein the current pattern is captured by:

computing attentions based on a current content of the memory and a current adaptation parameter;

selecting a set of top relevant attentions from the computed attentions; and updating the current adaptation parameter by taking a weighted sum of the current content of the memory weighted by the set of top relevant attentions.

20. The non-transitory processor-readable storage medium of claim 19, further comprising:

performing a write operation to update and accumulate the current content of the memory based on the updated current adaptation parameter.

\* \* \* \* \*